United States Patent [19]
Campbell

[11] Patent Number: 5,424,791
[45] Date of Patent: Jun. 13, 1995

[54] CAMERA STABILIZATION SUPPORT

[76] Inventor: Robert D. Campbell, 7101 Montebella, Tucson, Ariz. 85704

[21] Appl. No.: 149,123

[22] Filed: Nov. 4, 1993

Related U.S. Application Data

[63] Continuation of Ser. No. 827,381, Jan. 29, 1992, abandoned.

[51] Int. Cl.$^6$ ..................... G03B 17/00; G03B 29/00
[52] U.S. Cl. ........................ 354/82; 354/293; 352/243
[58] Field of Search ................ 354/81, 82, 293; 352/243

[56] References Cited

U.S. PATENT DOCUMENTS

| | | | |
|---|---|---|---|
| 730,458 | 6/1903 | Howe | 354/82 |
| 1,236,947 | 8/1917 | Landis | 354/82 |
| 2,926,591 | 3/1960 | Huffman | 354/82 |
| 4,177,967 | 12/1979 | Marchus | 354/82 X |
| 4,415,250 | 11/1983 | Rossman et al. | 354/82 X |
| 4,437,753 | 3/1984 | Dunn | 354/293 |
| 4,630,911 | 12/1986 | Paul | 354/82 |
| 4,727,390 | 2/1988 | Brown | 354/82 |

*Primary Examiner*—Khanh Dang
*Assistant Examiner*—J. K. Han
*Attorney, Agent, or Firm*—J. Michael McClanahan

[57] ABSTRACT

A camera stabilizing support for steadying (either still or moving at a constant rate) a camera and/or camera and accessories by a photographer while taking pictures. The device includes a shoulder stock having an upper arm and lower arm which together substantially encompass the photographer's shoulder, an extension member attached to the shoulder portion, and a rectangularly shaped enclosure frame attached to the extension member. The rectangularly shaped enclosure frame is so constructed as to provide a hand piece for the photographer to grip and hold the invention during picture taking as well as carrying over long distances. In addition, as part of the enclosure frame, an upper camera and accessories plate and lower strobe light and tripod plate are provided. The upper plate is adapted to receive a release mechanism for securing the camera and lens and the lower plate alternately or simultaneously secures a strobe light bracket and a tripod. By means of the subject device, the photographer is able to grip the camera stabilization support in a securely held position to stabilize the camera whether the photographer is standing still or in motion to track a moving target.

9 Claims, 2 Drawing Sheets

CAMERA STABILIZATION SUPPORT

This application is a continuation of application Ser. No. 07/827,381, filed on Jan. 29, 1992, now abandoned.

BACKGROUND OF THE INVENTION

1. Field of the Invention

The field of the invention is devices to secure a camera with its accessories including telescopic lens to a photographer's shoulder for purposes of stabilizing the camera while taking pictures.

2. Description of the Related Art

Apparatus which secures a camera and camera with telescopic lens and other accessories, to the photographer's body for purposes of stabilizing the camera at the time that pictures are snapped have been known for some considerable time. For example, Howe in U.S. Pat. No. 730,458 secured a box camera below the barrel portion of a gun-shaped stock. The inventor states that with sights along the barrel portion of the gun-shaped support, the camera may be properly aimed so that images of the objects of the picture will be properly centered. In that invention, the trigger assembly of the gun-shaped support was rigged to operate the shutter release of the camera. Landis in U.S. Pat. No. 1,236,947 devised a similar invention with slightly different mechanism connecting the trigger of the gun-shaped support to the shutter actuator of the camera.

Huffman (U.S. Pat. No. 2,926,591) provides a camera support comprising a thin, rod-like, elongated structural member, with a camera mounted somewhat centrally thereto and at opposite ends, rotatable elements, one of which is pressed against the shoulder and the other provides a hand grip. The user photographer brings the rotatable element against the shoulder and holds it there with pressure by holding onto the other rotatable elements while looking through the camera range finder to take a picture.

Apparatus for guidance of the direction a camera is pointed utilizing a tripod with a universal movement head is shown in the United States Patent to Marchus, U.S. Pat. No. 4,177,967. The guidance mechanism includes a portion contacting the photographer's shoulder with a second part at right angles, the second part attaching to the camera and the tripod head.

Dunn, in U.S. Pat. No. 4,437,753 details apparatus for camera stabilization wherein two attached support arms emerge from a base to which the camera is attached, one of the support arms directed to the shoulder of the photographer and the other to the photographer's sternum. The photographer, in grasping the camera and the body of the apparatus presses the support arms against the contacted portions of the body. With some similarities to the early patents of Howe and Landis, Rossmann in U.S. Pat. No. 4,415,250, utilizes the cheek piece and grip of a simulated rifle stock for securing a telescopic lens to which a camera is attached. Rossmann further utilizes a trigger-like member to quickly focus the lens.

Lastly, a camera mounting and steadying device is shown in the United States Patent to Brown, U.S. Pat. No. 4,727,390, wherein with a number of differently angled elements interconnecting to form the device, a vertical handle assembly provides the means to which is secured a camera mounting base at its top end and a shoulder brace operably attached approximately at the center. The camera is utilized with the operator holding both hands on the handle assembly.

The above devices seemingly provide means to secure and stabilize a camera by pressing a support element against the user's body. However, it has been the inventor's discovery that with the heavy camera equipment needed for very long-distance telescopic lens, the weight of which is held some distance from the photographer, more than what was described above and known to the inventor, is needed to support and stabilize the camera and accessories for picture taking. This is especially so when moving the camera to follow, say, a bird in flight, when the only motion wanted is the linear (instantaneous) motion of the bird's travel. A stabilized camera need not be still, but if in motion, it needs be constant, i.e., not changing.

Accordingly, it would be useful to provide a camera stabilization device adapted to secure a camera along with its accessories at a distance from the photographer for picture taking. In addition, it is useful to provide a camera stabilizing support which allows the user to wheel around swiftly and not lose contact between the camera stabilizing support and the photographer's body.

SUMMARY OF THE INVENTION

The embodiment of the invention described consists of a camera stabilizing support adapted to receive a camera and/or camera and accessories while secured to the photographer's shoulder in such a manner as to steady the camera in order that a stable platform (either still or moving at a constant rate) is provided for picture taking. In that respect, the present invention comprises an elongated extension member having two ends, one end terminating in a shoulder stock and the other end terminating in a rectangularly-shaped enclosed frame. The shoulder stock is shaped so as to securely engage the photographer's shoulder by engaging underneath the shoulder into the armpit and then well over the shoulder on the top. The rectangularly-shaped enclosed frame contains means to allow a secure grasp by the photographer's hand during picture taking, as well as means to secure the camera and accessories, namely two plates, a first to receive a release mechanism which in turn secures a band circumscribing the telescopic lens, and a second to provide means to secure a strobe light or other source of illumination, and/or a tripod. Lastly, the rectangularly-shaped enclosure frame also serves as a carrying handle for long distances, especially when the camera and accessories are mounted.

By the design and construction of the elements comprising the subject camera stabilizing support, the photographer may pick up and seat the invention to his or her shoulder very quickly, engaging the shoulder stock under the arm and over the shoulder, rotating to the point where the shoulder stock lower arm engages the photographer's under arm and the top arm of the shoulder stock rests down upon the shoulder so that the camera or the camera and accessories is instantly positioned and stabilized. Also, in the event that the photographer turns suddenly while using this invention, the method by which the device is secured to the shoulder assures that it will not slip out of place and thus cause a loss of valuable time in restabilizing the camera.

In addition, the invention is constructed so that weighty camera and camera accessories mounted at the distal end of the extension member tend not to over-balance the operator so as to allow the camera to pitch over.

Accordingly, it is an object of the present invention to provide a camera stabilizing support which is easily secured to a photographer's shoulder and which readily permits stabilization of the camera for picture taking.

It is another object of the subject invention to provide a camera stabilizing support so constructed to prevent the camera and accessories weighted end from pitching down.

It is still another object of the subject invention to provide a camera stabilizing support with an enclosed hand grasping portion which permits secure holding of the invention.

It is a further object of the subject invention to provide a camera stabilizing support with means to attach a camera and accessories at the same time as strobe lights.

Other objects of the invention will in part be obvious and will in part appear hereinafter. The invention accordingly comprises the apparatus possessing the construction, combination of elements, and arrangement of parts which are exemplified in the following detailed disclosure and the scope of the application which will be indicated in the claims.

BRIEF DESCRIPTION OF THE DRAWINGS

For further understanding of the features and objects of the subject invention, reference should be made to the following detailed description taken in connection with the accompanying drawings wherein.

In various views, like index numbers refer to like elements.

DETAILED DESCRIPTION OF THE PREFERRED EMBODIMENT

Figure 1:
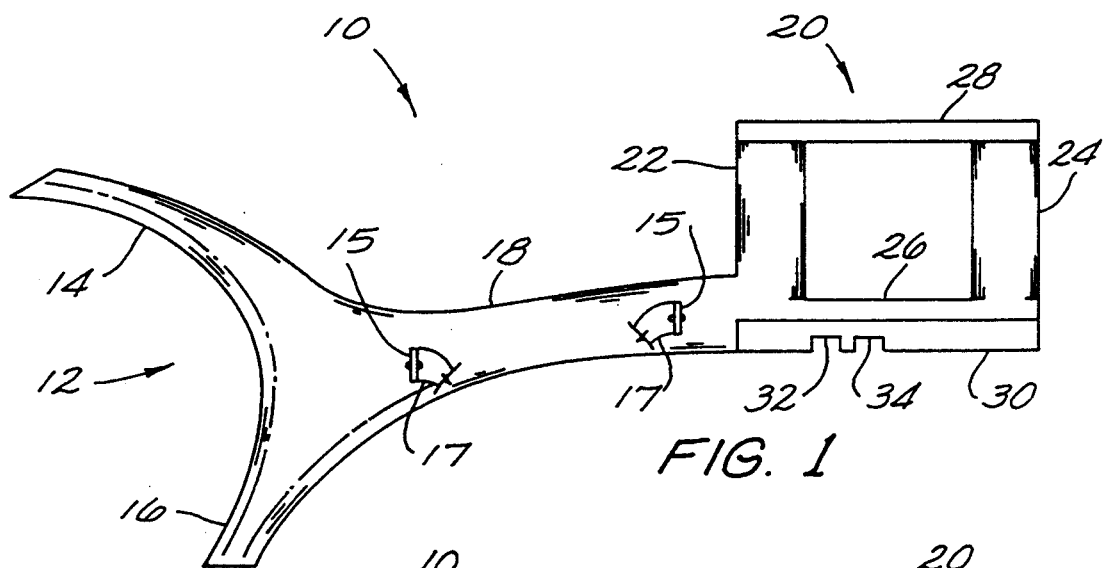
FIGS. 1 and 1.A. are a side and top view respectively of the subject inventive camera stabilizing support.
Figure 1A:
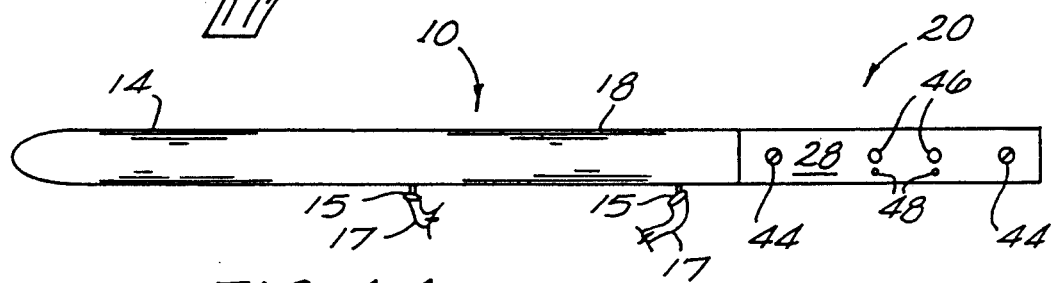

Referring now to FIG. 1, a side view is shown of the subject camera stabilizing support 10. Proceeding from the left, shoulder stock 12 is seen having its substantial encompassing arms, namely upper arm 14 and lower arm 16, upper arm 14 adapted to reside snugly against the photographer's shoulder as the invention is slightly rotated in such a manner as to be substantially held. Lower arm 16 is adapted to protrude well into the armpit and against the under portion of the photographer's arm. When the camera stabilizing support is used as anticipated, the photographer's arm is raised (at the shoulder) to operate the camera shutter (and other adjustments) so as to also prevent lateral movement of the shoulder stock from its locked-in position. Proceeding to the right, elongated extension member 18 extends from shoulder stock 12 to the camera securing portion 20, i.e., the rectangularly shaped enclosure frame which receives the camera, strobe light, lens, tripod and the like. Rectangularly shaped enclosure frame 20 contains a pair of upright structural members substantially transverse to extension member 18, spaced apart, namely forward structural member 24 and rearward structural member 22. Forward structural member may also be designated as "hand piece" 24. Connecting the forward and rearward structural members along the bottom and part of the extension member is connecting web 26.

In the preferred embodiment, shoulder stock 12, extension member 18 with web 26, and forward and rearward structural members 24 and 22, comprise a single piece of material, preferably a hardwood. Hardwood is preferable since it is not as cold or hot to the touch as is metal. If desired, a durable plastic may also be employed as material. The surface of the aforementioned elements is rounded and smooth to the touch so as to give a pleasant and tasteful appearance to the article.

In order to receive the camera and its various accessories, metal plates have been added, attached to the forward and rearward structural members 24 and 22 respectively, and to web 26, connecting the structural members. At the upper portion of FIG. 1 is a first plate, namely camera and accessories plate 28 which consists of a flat rectangle-shaped metal plate having a thickness, in the preferred embodiment, of about ⅜ inch. As will be more fully discussed later, drilled through the plate are a plurality of openings adapted to receive various securing mechanisms. To the bottom of web 26, in a notched portion in extension member 18, is secured a second plate, namely strobe light and tripod plate 30 which has, as seen in FIG. 1, transverse and parallel spaced apart grooves 32 and 34, which are adapted to secure and align a bracket holding the strobe light of the strobe light assembly. Like plate 28, plate 30 is a flat rectangle-shaped metal plate, however, plate 30 has a thickness of approximately ½ inch. Plate 28 is secured to the forward and rearward structural members 24 and 22, respectively, by means of countersunk wood screws which penetrate plate 28 into the wood bulk of the structural members. It was found that one screw proximate each end of plate 28 penetrating each structural member was sufficient to secure the plate to the structural members. With respect to bottom plate 30, here again two countersunk wood screws, one at each end of plate 30, firmly secure the plate to web 26. In the alternative, two long bolts may be used wherein the openings in plate 28 are threaded and the bolts enter plate 30, passing longitudinally through forward and rearward structural members 22 and 24 to screw into plate 28.

Also shown in FIG. 1, are swivel fasteners 15 with connected strap 17 which allows the invention to be carried over a person's shoulder, much as a rifle strap.

Lastly, with a camera and accessories attached to camera stabilizing support 10, the invention may be comfortably carried for long distances by holding at web 26, the party's hand and fingers surrounding web 26 and plate 30. In such case, the invention is carried upside down.

FIG. 1.A. shows a top view of the subject invention detailing, from left to right, upper arm 14 of the shoulder stock connecting to extension member 18 and then first plate (camera and accessories plate) 28. Numerous openings and screws are shown in the face of plate 28, all more fully discussed in connection with FIG. 3.

Figure 2:
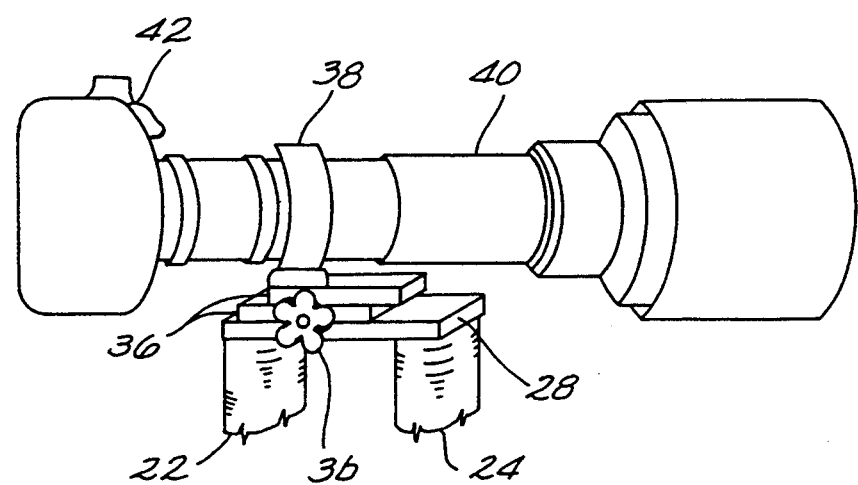
FIG. 2 is a perspective view of a camera and telescopic lens mounted to the camera and accessories securing plate of the invention.

FIG. 2 is a perspective view of the invention in use with camera 42 and telescopic lens 40 secured to the camera and accessories plate 28 by means of a lens securing device. Attached to plate 28 is lens release mechanism 36 which, in the preference of the inventor is a commercially available Acra Swiss type release. This mechanism, numeral 36, is secured to plate 28 through the means of a centrally located countersunk machine screw whose shank penetrates into a centrally located threaded opening in plate 28. Release mechanism 36 is further secured from rotating about the center screw by means of a machine screw which is threaded from below through plate 28 to have its shank end forcibly engage the bottom of the release mechanism 36. By such means, the tendency of the release mechanism 36 to rotate is inhibited. This solves a problem which exists with other camera shoulder stocks that the inventor is aware of, due to the fact that with rather large telescopic lens, the resultant moment arm around the release mechanism is quite substantial.

Release mechanism 36, shown in FIG. 2, is preferably of the type whose upper portion slides within a groove having dovetail sides formed in its lower portion and, as pictured in FIG. 2, the upper portion has moved to perhaps its forwardmost position. Operably attached to release mechanism 36 is band 38 which encompasses the telescopic lens in a secure manner. Band 38 includes a mounting mechanism at its lower portion which is attached to the upper slide of release mechanism 36. Lastly, shown in FIG. 2 as part of release mechanism 36, is a knob which allows for transverse movement of the upper sliding portion (relative to the lower part) of the release mechanism for securing band 38 mounting mechanism. As its name connotes, release mechanism 36 allows for fairly rapid removal and placement of the securing band 38 holding the telescopic lens.

Figure 3:
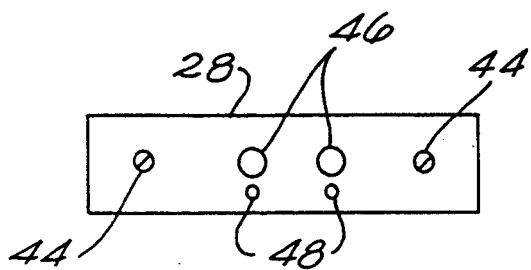
FIG. 3 is a top view of the camera and accessories securing plate of the invention.

FIG. 3 is a top view of camera and accessories plate 28 showing the two countersunk screws 44 which secure the top plate to the forward and rearward structural members and openings 46 which allows entrance of a countersunk screw protruding upright through plate 28 to engage the bottom side of the lower part of release mechanism 36 (not shown). Either one of the two openings 46 are utilized. Spaced apart from openings 46 are the tops of threaded screws 48, either one of which is adapted to forcibly engage the bottom of release mechanism 36 (not shown) to keep the release mechanism from pivoting around screw 46.

Figure 4:
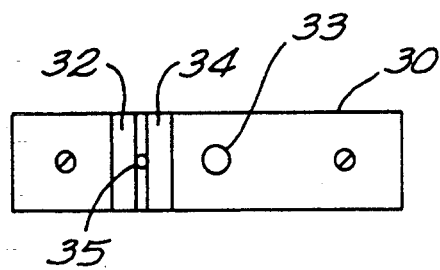
FIG. 4 is a bottom view of the strobe light and tripod securing plate of the invention.

FIG. 4 is a bottom view of strobe light and tripod plate 30 showing, first, the securing wood screws situated proximate each end and the pair of transverse grooves 32 and 4. Central to the island between grooves 32 and 34 is threaded opening 35. Opening 35 is adapted to receive a threaded knobbed bolt which holds a strobe light bracket in place. Also shown is threaded opening 33 centrally located in plate 30. Opening 33 is adapted to receive a threaded bolt for securing the plate (and remainder of invention) to a tripod.

Both plates 28 and 30 shown in FIGS. 3 and 4 are preferably aluminum alloy which is sufficiently hard to accept threads and one which will take and retain a dull shine when buffed. The exterior edges are rounded by filing so as to continue the pleasant appearance of the invention. As shown in FIG. 1, plate 30 is recessed into web 26 of camera stabilization support 10, both of which, in combination with the forward and rearward structural members, define an enclosed carrying handle.

Figure 5:
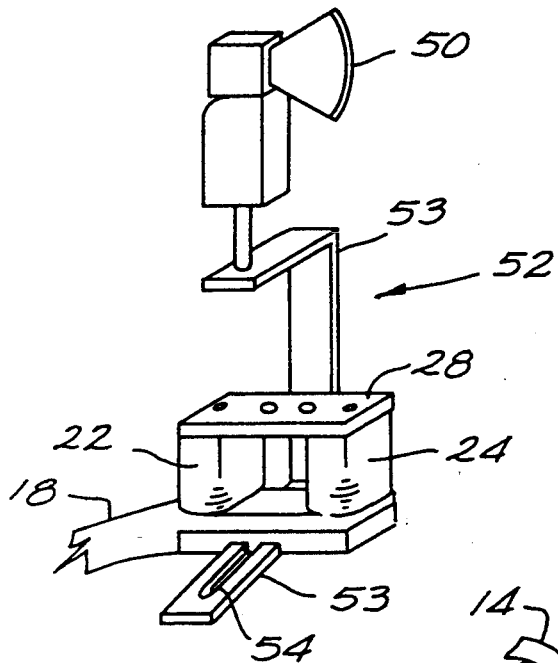
FIG. 5 is a perspective view of the rectangularly shaped enclosed frame portion of the invention with an attached bracket of the strobe light.

FIG. 5 is a perspective view of the subject invention fitted with strobe light assembly 52 consisting of a bracket 53 which in turn secures the flash or strobe light 50. Bracket 53 is a rather large U-shaped structure, having at its top part the battery and reflector for strobe light 50. Along the lower leg portion of U-shaped bracket 53 is an elongated slot 54 which slideably receives the island between transverse grooves 32 and 34. The lower arm of bracket 53 is secured in transverse slots 32 and 34 by means of a wing bolt and washer assembly (not shown), the threaded shank portion of the knobbed bolt screwed into opening 35 shown in FIG. 4. By such means, bracket 53 is slideably secured in transverse grooves 32 and 34. In FIG. 5, it is noted for purposes of illustration, camera 42 and lens 40, together with release mechanism 36, have not been shown attached to plate 28 but bracket 53 is so shaped as to have its upper arm located above the telescopic lens 40 shown in FIG. 2.

Figure 6:
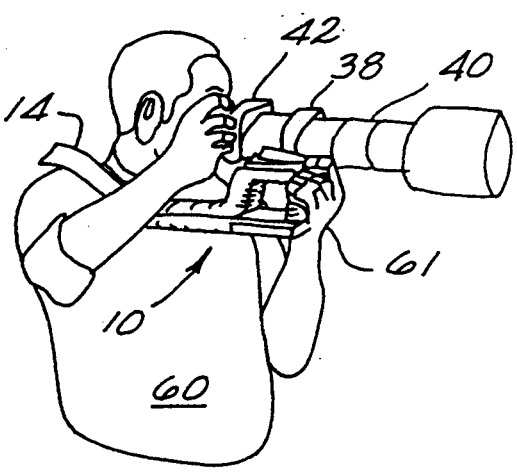
FIG. 6 is a perspective view of a photographer using the invention.

FIG. 6 is a perspective view of a photographer using the invention without the flash but with telescopic lens 40. Shown in FIG. 6 is photographer 60 holding the subject camera stabilization support 10 with the shoulder portion firmly held against the person's shoulder with upper arm 14 riding over and against the photographer's shoulder as the invention is rotated, and lower arm 16 completely hidden in the photographer's armpit and engaging the under side of the arm. The photographer is securing the forward structural member with its rounded corners with his left hand 61 while the right hand is available to manipulate camera 42 shutter system.

It is thus apparent that the subject invention provides means for the photographer to support on a stabilized, steady-state platform, a rather heavy camera and its accessories, including a strobe light all fully controlled by the photographer's torso so as to enhance picture taking.

Accordingly, the invention should not be limited by the description of the foregoing specific embodiment thereof, since many variations and adaptations thereof will be apparent to those skilled in the art, but should be limited only by the following claims.

I claim:

1. A camera stabilizing support for steadying a camera and camera accessories against a shoulder and torso of a photographer while taking a picture, the camera stabilizing support comprising:

a singular rigid elongated extension member having a first and second end, said extension member second end having a flat bottom portion with a pair of parallel, spaced apart grooves operably formed therein, said grooves situated transverse to said elongation of said elongated extension member, said grooves adapted to receive a strobe light assembly;

a shoulder stock attached to said extension member first end, said shoulder stock adapted to engage the photographer's shoulder; and means to secure the camera and accessories, said means operably attached to said extension member second end, said means including:

a forward upwardly protruding member and a rearward upwardly protruding member attached to said extension member second end, said forward and rearward upright member extending transversely from said extension member, and an accessories plate operably connected to said forward and rearward upright member distal said extension member second end, said accessories plate, forward and rearward upright member, and extension member second end defining a rectangularly shaped enclosure frame whereby when the photographer places said shoulder stock to his shoulder and holds said forward upright member with a hand, the shoulder stock is secured against the photographer's shoulder and the camera and camera accessories are stabilized for taking a picture.

2. The camera stabilizing support as defined in claim 1 wherein the camera and accessories includes a lens release mechanism, and said accessories plate includes means to secure the lens release mechanism.

3. The camera stabilizing support as defined in claim 2 wherein said shoulder stock includes a lower protruding arm and an upper protruding arm, said lower protruding arm penetrating into an armpit of the photographer and said upper protruding arm protrudes over the photographer's shoulder whereby when said shoulder stock is placed to the photographer's shoulder, said shoulder stock upper arm and lower arm are stabilized by the photographer's shoulder and torso.

4. The camera stabilizing support as defined in claim 3 wherein said forward upright member extending from said extension member second end defines a hand piece, said hand piece having a rounded contour adapted to be held by the photographer's hand when the camera stabilizing support is secured against the photographer's shoulder, the camera stabilizing support restrained there by the photographer holding said hand piece to thereby stabilize the camera for taking pictures.

5. The camera stabilizing support as defined in claim 4 further including a tripod plate, said tripod plate operably attached to said extension member second end, said tripod plate adapted to attach to a tripod.

6. The camera stabilizing support as defined in claim 5 wherein said pair of parallel, spaced apart grooves adapted to receive the strobe light assembly operably formed in said elongated extension member second end are formed in said tripod plate.

7. The camera stabilizing support as defined in claim 6 wherein said elongated extension member second end includes a notch formed in said second end, said notch receiving said tripod plate.

8. The camera stabilizing support as defined in claim 7 wherein said accessories plate includes means to engage the lens release mechanism to prevent rotating movement of the lens release mechanism, said means including a threaded screw to forcibly engage the lens release mechanism and thereby prevent rotation of the lens release mechanism and the camera and accessories.

9. The camera stabilizing support as defined in claim 8 further including a pair of swivels operably attached to said elongated extension member, and a carrying strap, said carrying strap attached to said swivels, said carrying strap enabling the photographer to carry the camera stabilizing support.

* * * * *